J. FABIAN.
INSECT TRAP.
APPLICATION FILED JAN. 15, 1912.
1,084,417.
Patented Jan. 13, 1914.
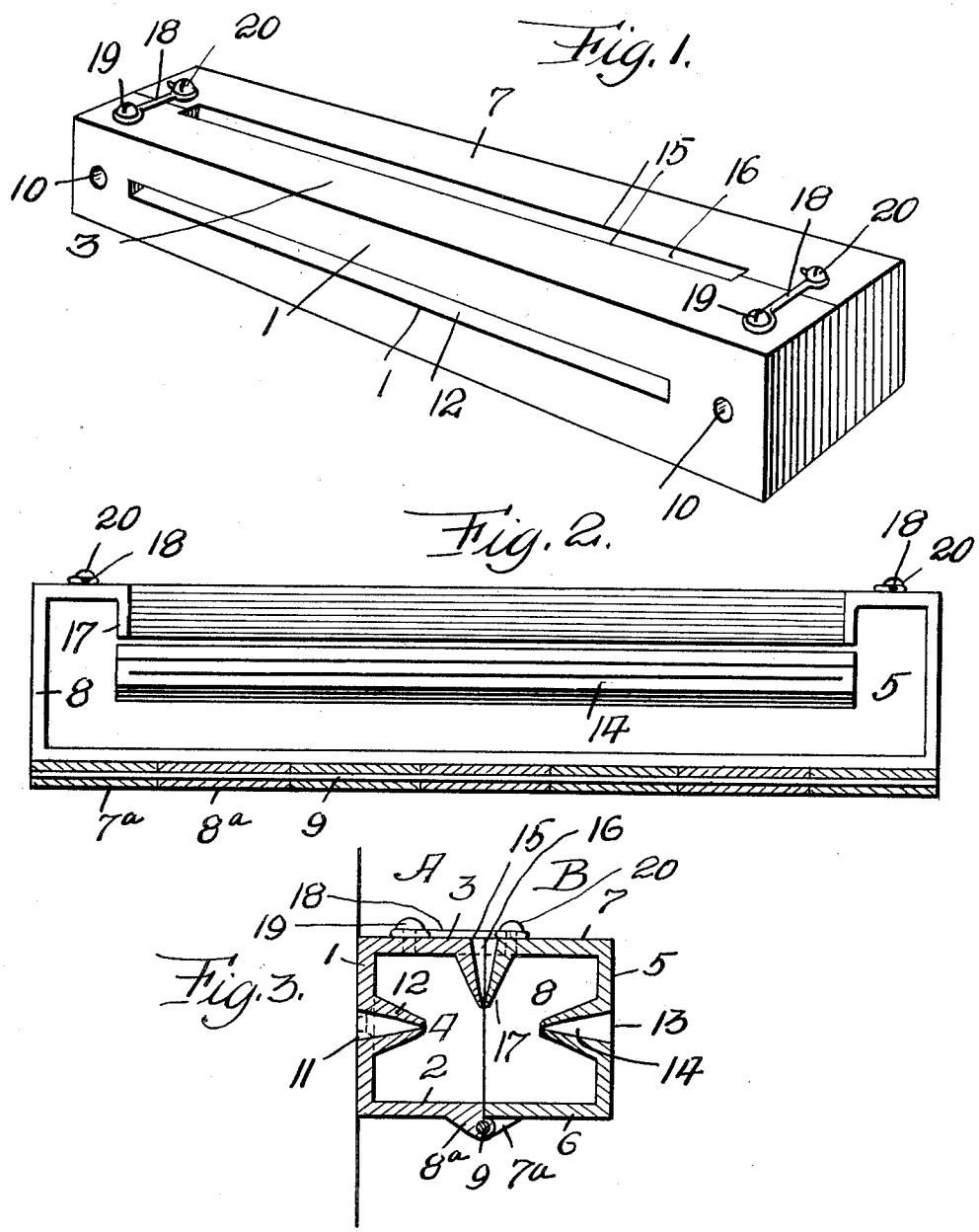

UNITED STATES PATENT OFFICE.

JULIUS FABIAN, OF PHILADELPHIA, PENNSYLVANIA.

INSECT-TRAP.

1,084,417. Specification of Letters Patent. Patented Jan. 13, 1914.

Application filed January 15, 1912. Serial No. 671,146.

*To all whom it may concern:*

Be it known that I, JULIUS FABIAN, a citizen of the United States of America, residing at Philadelphia, in the county of Philadelphia and State of Pennsylvania, have invented certain new and useful Improvements in Insect-Traps, of which the following is a specification, reference being had therein to the accompanying drawing.

This invention relates to an insect trap especially designed for entrapping bedbugs and small vermin, and the primary object of my invention is to provide a trap that can be easily and quickly secured to the side rails of a bedstead, a wall or other support, whereby bedbugs can readily crawl on to the same and enter the trap.

Another object of this invention is to provide a sectional trap that can be easily opened and thoroughly cleansed and maintained in a sanitary condition.

A still further object of this invention is to provide a trap of the above type that is inexpensive to manufacture, durable and of such construction that it is highly efficient for the purposes for which it is intended.

I attain the above objects by a mechanical construction that will be hereinafter specifically described and then claimed, and reference will now be had to the drawing, wherein:

Figure 1 is a perspective view of the trap. Fig. 2 is a longitudinal sectional view of the same, and Fig. 3 is a cross sectional view of the trap.

A trap in accordance with this invention comprises an oblong box like structure having two sections generally designated A and B. Each of said sections is formed of a single piece of material and the section A comprising a rear wall 1, a bottom plate 2, a top plate 3, and end walls 4.

The section B comprises a front wall 5, a bottom plate 6, a top plate 7, and end walls 8. The bottom plate 6 of the section B is provided with longitudinally disposed and equally spaced barrels 7ᵃ adapted to fit between similar barrels 8ᵃ carried by the bottom plate 2 of the section A, said barrels being maintained in longitudinal alinement by rods 9 that pivotally connect said sections together, whereby the section B can be swung to an open position relatively to the section A to permit of said sections being thoroughly cleansed and the trap emptied of such vermin that may crawl therein.

The rear wall of the section A has the ends thereof provided with openings 10 to receive screws or other fastening means (not shown) for securing the trap to a suitable support, as the vertical rail of a bed, a wall, or upright adjacent to an object that is infested with vermin.

The rear wall 1 has a longitudinal slot 11 and an inwardly projecting tapering entrance piece 12 that is in communication with the slot 11, said entrance piece in connection with said slot providing a tapering entrance for a bedbug or other vermin. The entrance piece 12 is designed whereby after the bedbug has passed through the same, it will be extremely difficult for the bedbug to return, on account of the inner end of the opening of the entrance piece being smaller than the slot 11.

The front wall 5 of the section B has a slot 13 and an inwardly projecting entrance piece 14, said entrance piece being similar to the entrance piece 12 of the section A.

The top plates 3 and 7 of the sections A and B respectively are cut away, as at 15 to provide a slot 16, and the top plates 3 and 7 support sections of an entrance piece 17, similar to the entrance pieces 12 and 14.

The sections A and B of the trap are maintained in a closed position by hooks 18 pivotally connected, as at 19, adjacent to the end of the top plate 3 of the section A, said hooks engaging pins or screws 20, carried by the top plate of the section B adjacent to the end of said section.

It is apparent that the section B can be easily and quickly opened relatively to the section A and the interior of the trap thoroughly cleaned.

The trap in its entirety can be made of wood or light and durable metal, and it can be used without necessarily securing it to a suitable support.

What I claim is:—

An insect trap comprising a rectangular box-like structure formed of two oblong sections each formed of a single piece of material, each including a top, a bottom, a pair of end walls, an outer longitudinally slotted side wall and further having an open inner side, each of said tops having the inner longitudinal edge inset for a portion of its length, an inwardly extending outwardly inclined extension projecting from said inset portion, said inset portions and extensions registering thereby providing a longitudinal slot, means for hinging the bottom of one section to the bottom of the other section, means for maintaining said sections in abutting engagement, one of the side walls of one of said sections provided with openings for the passage of fastening means to secure the strap to a support, and means integral with and projecting inwardly from each of said side walls centrally thereof to provide elongated longitudinally extending entrance pieces communicating with the slots of the side walls and forming passages gradually decreasing in height inwardly.

In testimony whereof I affix my signature in the presence of two witnesses.

JULIUS FABIAN.

Witnesses:
JOHN ERDSAY,
JOSEF MAYER.